(12) United States Patent
Hossieny et al.

(10) Patent No.: US 10,807,344 B2
(45) Date of Patent: Oct. 20, 2020

(54) POLYMER FOAM INSULATION STRUCTURE HAVING A FACING OF A MULTI-LAYER SHEET THAT CONTAINS A HEAT RESISTANT POLYMER LAYER AND A POLYLACTIDE RESIN LAYER

(71) Applicant: NatureWorks LLC, Minnetonka, MN (US)

(72) Inventors: Nemat Hossieny, Medina, MN (US); Osei A. Owusu, Plymouth, MN (US); Manuel A. W. Natal, Eden Prairie, MN (US); Deepak Venkatraman, Plymouth, MN (US)

(73) Assignee: NatureWorks LLC, Minetonka, MN (US)

( * ) Notice: Subject to any disclaimer, the term of this patent is extended or adjusted under 35 U.S.C. 154(b) by 85 days.

(21) Appl. No.: 16/094,269

(22) PCT Filed: Apr. 24, 2017

(86) PCT No.: PCT/US2017/029193
§ 371 (c)(1),
(2) Date: Oct. 17, 2018

(87) PCT Pub. No.: WO2017/189453
PCT Pub. Date: Nov. 2, 2017

(65) Prior Publication Data
US 2019/0126591 A1    May 2, 2019

Related U.S. Application Data

(60) Provisional application No. 62/329,128, filed on Apr. 28, 2016.

(51) Int. Cl.
*B32B 5/20*     (2006.01)
*B32B 27/06*    (2006.01)
(Continued)

(52) U.S. Cl.
CPC ............ *B32B 5/20* (2013.01); *B29C 44/1228* (2013.01); *B29C 48/21* (2019.02); *B32B 7/12* (2013.01);
(Continued)

(58) Field of Classification Search
CPC ........... B32B 5/20; B32B 7/12; B32B 15/046; B32B 27/065; B32B 27/08
See application file for complete search history.

(56) References Cited

U.S. PATENT DOCUMENTS 5,219,665 A * 6/1993 Chen .................... B29C 44/065
428/515
6,290,896 B1    9/2001 Suzuki
(Continued)

FOREIGN PATENT DOCUMENTS

EP    2750851 A    7/2014
EP    2841246 A    3/2015
(Continued)

OTHER PUBLICATIONS

[NPL-1] "Overview of materials for Ethylene Vinyl Alcohol (EVOH)"; MatWeb database, Mar. 6, 2020, <http://www.matweb.com/search/datasheet_print.aspx?matguid=744899e4ab06482da9cf86d8f450db0d>. (Year: 2020).*

*Primary Examiner* — Stella K Yi

(57) ABSTRACT

Thermal insulation structures include a polymer foam layer adhered to a multi-layer sheet having a non-cellular layer of a heat-resistant thermoplastic and a second non-cellular layer of a polylactide resin. The polylactide resin is a surprisingly good barrier to the diffusion of atmospheric gases into the foam layer and of blowing agents out of the foam layer. Accordingly, the diffusion of atmospheric gases and blowing agents is retarded substantially. This greatly reduces the loss of thermal insulation capacity of the structure due to the replacement of the blowing agent with (Continued)

atmospheric gases. The multi-layer sheet exhibits excellent thermal stability, even when the polylactide in the polylactide layer is highly amorphous.

6 Claims, 1 Drawing Sheet

(51) Int. Cl.
| | |
|---|---|
| B32B 27/08 | (2006.01) |
| B32B 27/36 | (2006.01) |
| B29C 44/12 | (2006.01) |
| B29C 48/21 | (2019.01) |
| B32B 7/12 | (2006.01) |
| B32B 15/04 | (2006.01) |
| B32B 15/095 | (2006.01) |
| B32B 15/18 | (2006.01) |
| B32B 27/40 | (2006.01) |
| B29K 33/00 | (2006.01) |
| B29K 67/00 | (2006.01) |
| B29K 105/00 | (2006.01) |
| B32B 37/00 | (2006.01) |
| B32B 37/12 | (2006.01) |
| B32B 37/04 | (2006.01) |
| B29L 9/00 | (2006.01) |
| B29L 31/00 | (2006.01) |
| B29K 105/24 | (2006.01) |
| B29C 48/00 | (2019.01) |
| B29C 51/14 | (2006.01) |
| B29K 105/26 | (2006.01) |

(52) U.S. Cl.
CPC .......... *B32B 15/046* (2013.01); *B32B 15/095* (2013.01); *B32B 15/18* (2013.01); *B32B 27/065* (2013.01); *B32B 27/08* (2013.01); *B32B 27/36* (2013.01); *B32B 27/40* (2013.01); *B29C 44/1271* (2013.01); *B29C 48/0012* (2019.02); *B29C 51/14* (2013.01); *B29K 2033/12* (2013.01); *B29K 2067/046* (2013.01); *B29K 2105/0085* (2013.01); *B29K 2105/24* (2013.01); *B29K 2105/26* (2013.01); *B29L 2009/00* (2013.01); *B29L 2031/724* (2013.01); *B29L 2031/7622* (2013.01); *B32B 37/04* (2013.01); *B32B 37/12* (2013.01); *B32B 2037/0092* (2013.01); *B32B 2250/03* (2013.01); *B32B 2250/04* (2013.01); *B32B 2266/0278* (2013.01); *B32B 2305/022* (2013.01); *B32B 2305/70* (2013.01); *B32B 2307/304* (2013.01); *B32B 2307/306* (2013.01); *B32B 2307/308* (2013.01); *B32B 2307/7242* (2013.01); *B32B 2307/738* (2013.01); *B32B 2509/10* (2013.01); *B32B 2607/00* (2013.01)

(56) References Cited

U.S. PATENT DOCUMENTS

| | | | |
|---|---|---|---|
| 7,799,412 | B2 | 9/2010 | Yamamura |
| 2003/0038405 | A1* | 2/2003 | Bopp ............... B29C 51/002 264/319 |
| 2012/0225961 | A1 | 9/2012 | Van Horn |
| 2014/0147604 | A1 | 5/2014 | Nevalainen |
| 2014/0377568 | A1 | 12/2014 | Riebel |
| 2015/0290907 | A1 | 10/2015 | Chivrac |
| 2015/0376464 | A1 | 12/2015 | Gerard |

FOREIGN PATENT DOCUMENTS

| | | |
|---|---|---|
| WO | 2013/034701 A | 3/2013 |
| WO | 2013/016717 A | 10/2013 |
| WO | 2014/018817 A | 1/2014 |
| WO | 2014/135810 A | 8/2014 |

* cited by examiner

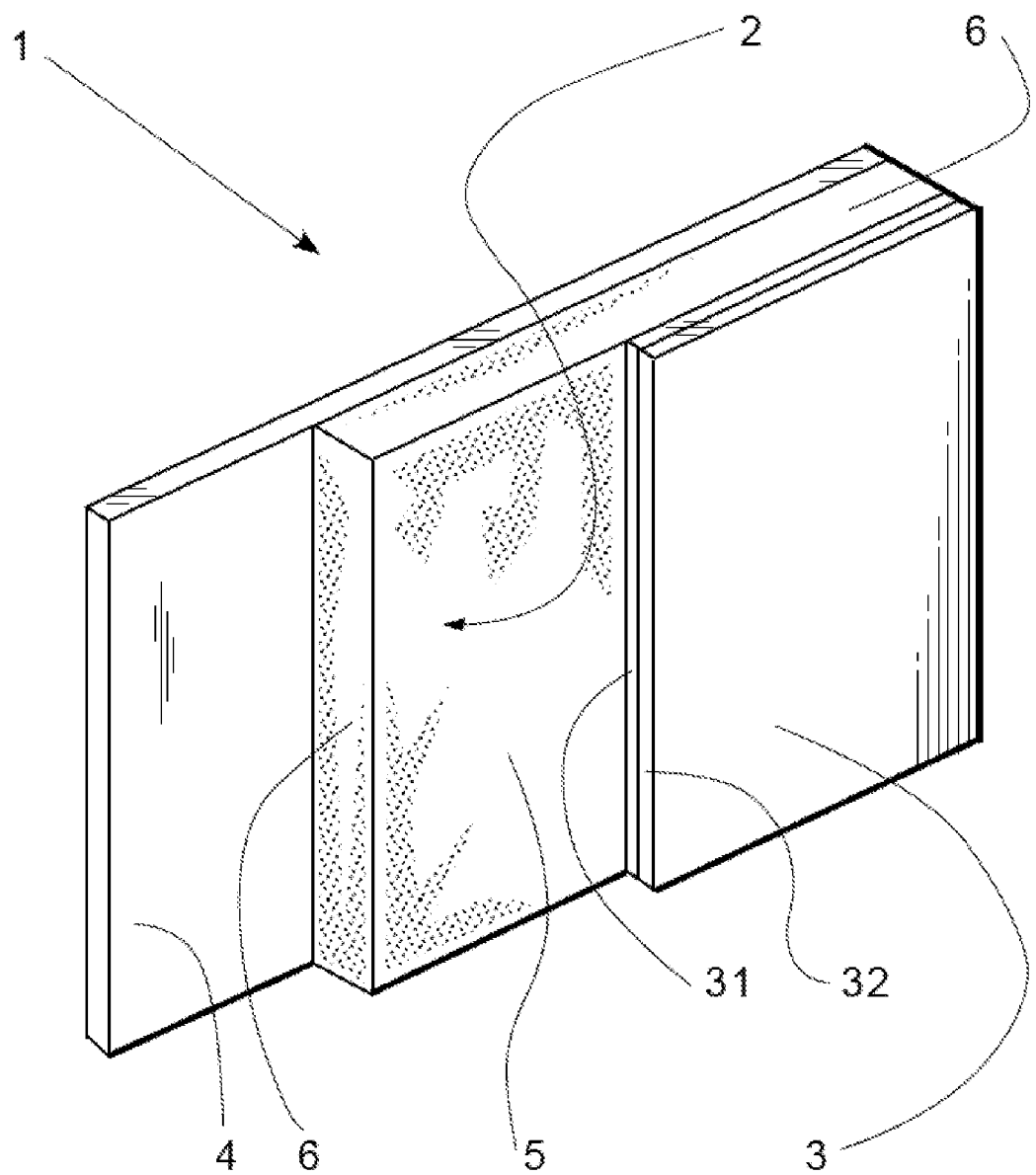

POLYMER FOAM INSULATION STRUCTURE HAVING A FACING OF A MULTI-LAYER SHEET THAT CONTAINS A HEAT RESISTANT POLYMER LAYER AND A POLYLACTIDE RESIN LAYER

This invention relates to polymer foam insulation structures that have a facing sheet on one or more sides of a layer of a polymer foam.

Foam insulation structures are produced in large quantities worldwide. Cabinets and doors for appliances such as refrigerators and freezers represent a significant segment of the market for these structures, but these structures are also useful as thermal insulation for buildings and other constructions, for insulating refrigerated trucks and ship hulls, and for many other uses.

The thermal insulation structures include a polymer foam layer, which is the primary insulating element. The structures also include a facing layer on one or both sides of the polymer foam layer. A facing layer may provide attributes such as strength and stiffness. A facing layer may serve as a protective layer to prevent damage to the foam and/or may include specific aesthetic or functional features as may be wanted in particular applications.

The polymer foam layer is a cellular material having both closed and open cells. The cells of the foam are filled with gas (blowing agents). The insulation capacity of the foam is mainly due to the gas (blowing agents) trapped inside the closed cells. The effectiveness of the foam blowing agents as an insulator can be characterized by their thermal conductivity in the gas phase relative to the thermal conductivity of air, typically 27 mW m$^{-1}$ K$^{-1}$ (Marrucho, et al., Aging of Rigid Polyurethane Foams: Thermal Conductivity of N$_2$ and Cyclopentane Gas Mixtures, *Journal of Cellular Plastics*, Vol. 41, 207, 2005). Initially, blowing agents that are used to produce the foam remain in the cells, and the thermal insulation structure has a low thermal conductivity or k-factor. Over time it loses a considerable part of the thermal insulation efficiency since, due to diffusion of air and moisture into the foam and of blowing agents out of the foam, the composition of the gas in the closed cells changes, hence, the k-factor increases with time. There is typically a rapid initial increase in the k-factor, which is believed to be attributable to the diffusion of air and other gases trapped during construction of the structure into the cells of the foam. This is followed by a slower increase, which is believed to be attributable to the diffusion of the air and moisture into the foam cells, followed by an even slower increase, which is believed to be attributable to the diffusion of blowing agents out of the foam. See, e.g., Wilkes et al., "Aging of Polyurethane Foam Refrigerator Panels—Initial Results with Third Generation Blowing Agents", presented at The Earth Technologies Forum, Washington, D.C., Oct. 26-28, 1998. Facing layers can retard the rate of blowing agent loss and alleviate this problem by forming a diffusion barrier.

In refrigerator and freezer cabinets and doors, the polymer foam layer typically is sandwiched between an exterior face (usually a metal such as steel) and an inner polymeric liner. The exterior face provides mechanical strength and puncture resistance. Polymeric materials are chosen for the inner liner material for several reasons including their lower weight, their ability to be inexpensively thermoformed into complex shapes, and for other aesthetic or functional reasons.

Acrylonitrile-butadiene-styrene (ABS) and high impact polystyrene (HIPS) resins are most frequently used to make the inner liner. Unfortunately, both of these materials are somewhat permeable to gases including atmospheric gases and the blowing agents most often used to make the polymer foam. Therefore, atmospheric gases diffuse into the foam and the blowing agents diffuse out of the foam and through the liner. Over time, the cabinet becomes less efficient as a thermal insulator and the appliance itself becomes less energy efficient. It would be desirable to provide a foam insulation structure having a better performing inner liner material.

In one aspect, this invention is a foam insulation structure comprising a) a polymer foam layer having opposing major surfaces and gas-filled cells that contain a physical blowing agent and b) a multi-layer sheet affixed to at least one of said opposing major surfaces of the polymer foam layer, wherein the multi-layer sheet includes i) a first non-cellular layer containing at least 50 weight-% of one or more thermoplastic resins, wherein the one or more thermoplastic resins is not a polylactide resin and has a Vicat softening temperature (ASTM D1525, 50° C./hr, 1 kg) of at least 70° C. and ii) a second non-cellular layer containing at least 50 weight-% of a polylactide resin, wherein the first non-cellular layer of the multi-layer sheet is sealingly affixed to the polymer foam layer and the second non-cellular layer of the multi-layer sheet is sealingly affixed to the first non-cellular layer of the multi-layer sheet.

It has been found, very surprisingly, that a polylactide resin is a highly effective barrier to the permeation of atmospheric gases and certain blowing agents from the insulation foam. The foam insulation structure therefore experiences a surprisingly slow loss of thermal insulation efficiency over time due to diffusion of atmospheric gases and blowing agents through the polylactide layer(s) of the multi-layer sheet.

In many cases, as with many refrigerators and freezers, the insulation foam layer is produced in a so-called "pour-in-place" process in which liquid foam precursors are applied to and react at the surface of the facing layer(s) to form the foam. The foam so produced adheres to the facing layer(s) to form the foam insulation structure. The foam precursors in such processes typically include at least one polyisocyanate, water, a physical blowing agent, and most typically one or more polyols. The foaming reaction is exothermic and can produce local temperatures of 60° C. to 160° C. or more. Exposure to these temperatures and to the reactive precursors can damage many polymeric liner materials. This restricts the range of liner materials that can be used in these "pour-in-place" processes.

Accordingly, the invention in another aspect is a method that comprises (1) applying a foam precursor mixture containing at least one polyisocyanate, water and a physical blowing agent to the surface of a first non-cellular layer of a multi-layer sheet, which multi-layer sheet includes i) the first non-cellular layer, which contains at least 50 weight-% of one or more thermoplastic resins, wherein the one or more thermoplastic resins is not a polylactide resin and has a Vicat softening temperature (ASTM D1525, 50° C./hr, 1 kg) of at least 70° C., said first non-cellular layer being sealingly affixed to ii) a second non-cellular layer containing at least 50 weight-% of a polylactide resin and (2) curing the foam precursor mixture while in contact with the first non-cellular layer of the multi-layer sheet to form a polymer foam layer adhered to the first non-cellular layer of the multi-layer sheet.

In specific embodiments, the foam insulation structure includes the polymer foam layer, a multi-layer sheet as described above in which the first non-cellular layer is sealingly affixed to one major surface of the polymer foam layer, and a second facing layer sealingly affixed to the opposing major surface of the polymer foam layer. Embodiments of this type may take the form of an appliance housing, such as a refrigerator or freezer cabinet or door.

The Figure is a perspective view, partially in section, of an embodiment of a foam insulation structure of the invention.

In the Figure, foam insulation structure 1 includes polymer foam layer 2 having a major surface 5 and an opposing major surface (obscured in this view). Multi-layer sheet 3 is affixed to major surface 5. Multi-layer sheet includes first non-cellular layer 31 which is sealingly affixed to major surface 5 of polymer foam layer 2 and to second non-cellular layer 32.

By "non-cellular" it is meant the sheet or layer referred to has a void volume of no greater than 10 volume-%. The sheet or layer preferably has a void volume of more preferably no greater than 5 volume-%, and still more preferably no greater than 2 volume-%.

Layers and/or sheet are "sealingly affixed" to each other if there are no openings (apart from manufacturing defects, if any) between them through which bulk transport of gas in or out of foam insulation structure 1 takes place. Therefore, gas moving out of polymer foam layer 2 through major surface 5 therefore must diffuse through first non-cellular layer 31 and second non-cellular layer 32 to escape from that side of the structure 1. Conversely, atmospheric gases moving into polymer foam layer 2 through major surface 5 therefore must diffuse through second non-cellular layer 32 and first non-cellular layer 31 to enter into polymer foam layer from that side of the structure 1. Typically, first non-cellular layer 31 is sealingly affixed to polymer foam layer 2 and to second non-cellular layer 32 by virtue of being adhered there to each of them, either directly or, less preferably, through an intermediate adhesive layer (not shown in the Figure). First non-cellular layer 31 preferably is in direct contact with major surface 5 of polymer foam layer 2, or in direct contact with an adhesive layer that itself is in direct contact with major surface 5 of polymer foam layer 2. Similarly, first non-cellular layer 31 preferably is in direct contact with second non-cellular layer 32, or in direct contact with an adhesive layer that itself is in direct contact with second non-cellular layer 32.

The "major" surfaces of any layer are the opposing surfaces that have the greatest surface areas. The "thickness" of any layer or of the structure as a whole is the smallest orthogonal dimension.

Polymer foam layer 2 is a cellular organic polymer (or mixture of organic polymers). The cells of the polymer foam are filled with one or more gases. The gases include one or more volatilized blowing agents. The cells preferably are mainly closed cells. For example, at least 50%, at least 75% or at least 90% of the cells of the polymer foam may be closed cells, as determined according to ASTM D6226.

The physical blowing agent is one or more compounds having a boiling temperature of −10° C. to 100° C. The physical blowing agent volatilizes during the production of the polymer foam to produce a gas that expands the polymer. The physical blowing agent may include, for example, a hydrocarbon such as a linear or branched alkane having 3 to 8 carbon atoms and/or a cycloalkane having 4 to 8 carbon atoms. The physical blowing agent may be a fluorocarbon, hydrofluorocarbon, fluorochlorocarbon, or hydrofluorochlorocarbon up to 8 carbon atoms such as, for example, 1,1,1,3,3-pentafluoropropane (HFC-245fa), 1,1,1,3,3-pentafluorobutane (HFC-365 mfc), 1,1,1,2,3,3,3-heptafluoropropane (HFC-227ea), 1,1,1,2-tetrafluoroethane (HFC-134a); a hydrohaloolefin blowing agent such as trifluoropropene, 1,3,3,3-tetrafluoropropene (1234ze); 1,1,3,3-tetrafluoropropene; 2,2,3,3-tetrafluoropropene (1234yf), 1,2,3,3,3-pentafluoropropene (1225ye); 1,1,1-trifluoropropene; 1,1,1,3,3-pentafluoropropene (1225zc); 1,1,2,3,3-pentafluoropropene (1225yc); (Z)-1,1,1,2,3-pentafluoropropene (1225yez); 1-chloro-3,3,3-trifluoropropene (1233zd) and 1,1,1,4,4,4-hexafluorobut-2-ene (1336mzzm), a dialkyl ether such as dimethyl ether, ethyl methyl ether or diethyl ether, and the like.

Preferred physical blowing agents include hydrocarbons, especially one or more alkanes having 3 to 8 carbon atoms such as n-butane, iso-butane, n-pentane, iso-pentane, n-hexane, iso-hexane, and one or more cycloalkanes such as cyclobutane, cyclopentane, cyclohexane, cycloheptane, and cyclooctane. Cyclopentane is an especially preferred physical blowing agent. The physical blowing agent may constitute, for example, 10 to 100, 25 to 100, 25 to 95, or 25 to 75 mole percent of the gas in the cells of the polymer foam.

The gas within the cells of polymer foam layer 2 may consist entirely of the physical blowing agent(s) or may in addition contain one or more other gases. In some embodiments, the gas includes one or more compounds produced by the reaction of a chemical blowing agent such as carbon dioxide (as produced, for example, by reaction of water with an isocyanate group and/or the decomposition of formic acid or formic acid ester) or nitrogen (as produced, for example, by the decomposition of an azo blowing agent). The gas in the cells may in addition include other gaseous compounds such as air or one or more components of air. Such other gas or gases may constitute, for example, up to 90 mole percent, up to 75 mole percent, 5 to 75 mole percent, or 25 to 75 mole percent of the gas in the cells of the polymer foam.

The polymer foam may include one or more thermoplastic polymers and/or one or more thermoset polymers. Thermoplastic polymers include, for example, polystyrene; styrene copolymers such as styrene-acrylonitrile copolymers and styrene-acrylic acid copolymers; polyethylene; and blends of any two or more of the foregoing. Thermoset polymers include, for example, isocyanate-based polymers such as polyurethanes, polyureas, polyurethane-ureas, polyisocyanurates, polyurethane-isocyanurates, polyurea-isocyanurates, polyurethane-urea-isocyanurates, and the like, which are produced by the polymerization of a polyisocyanate.

A preferred thermoset polymer is a reaction product of liquid foam precursors that include at least one polyisocyanate, water, a physical blowing agent, and optionally one or more polyols and/or isocyanate-reactive amines. Water in these systems functions as a chemical blowing agent and a chain extender by reacting with isocyanate groups to form a carbamic acid that in turn decomposes to carbon dioxide and an amine. The liberated carbon dioxide functions as a blowing gas, and the amine reacts with another isocyanate group to form a urea linkage, thereby extending the polymer chain. In such cases, the gas-filled cells will contain both carbon dioxide and the physical blowing agent. If one or more polyols are present, these react with isocyanate groups to produce urethane linkages. If isocyanate-reactive amines are present, these react with isocyanate groups to produce urea linkages. Examples of suitable systems for producing rigid, closed-cell isocyanate-based foams are described for example in U.S. Pat. Nos. 5,444,101, 6,753,357 and 8,937,107, US Published Patent Application No. 2015/0025164 and WO 2013/135746.

The foam density may be, for example 16 to 80 kg/m$^3$ or from 24 to 60 kg/m$^3$.

The thickness of the insulation foam layer may be, for example, at least 0.25 cm, at least 1 cm, or at least 2 cm, and may be as much as 50 cm, as much as 25 cm, at much as 12 cm, or as much as 7.6 cm.

First non-cellular layer 31 contains at least 50 weight-% of a thermoplastic resin, which is not a polylactide and has a Vicat softening temperature (ASTM D1525, 50° C./hr, 1 kg) of at least 70° C., preferably at least 80° C., more preferably at least 100° C.

Examples of suitable thermoplastic resins include homopolymers and copolymers of methyl methacrylate, polystyrene, styrene-acrylonitrile copolymers, acrylonitrile-butadiene-styrene copolymers, high-impact polystyrene, and the like. Preferred thermoplastic resins are homopolymers of methyl methacrylate and copolymers of methyl methacrylate which contain 70% or more by weight polymerized methyl methacrylate. Such thermoplastic resin may be a virgin material and/or include post-industrial and/or post-consumer scrap material. In some embodiments, the thermoplastic resin is miscible with the polylactide resin(s) of second non-cellular layer 32. By "miscible" it is meant that the resins when melt- or solution-blended form a single phase mixture after removal of solvent (if solution blended) and cooling to room temperature.

In some embodiments, first non-cellular layer 31 may contain up to 40 weight-%, up to 25 weight-%, or up to 10 weight-% of one or more polylactide resins as described below. In such embodiments, the polylactide resin(s) preferably is (are) miscible with the other thermoplastic resin.

The thermoplastic resin (or mixture of resins) used in first non-cellular layer 31 may be impact-modified, by which it is meant that the resin or mixture is combined with one or more additives that increase the impact strength of the resin or mixture relative to that of the neat resin or mixture by itself. A suitable amount of impact modifier is at least 0.25 parts by weight per 100 parts by weight of polylactide resin(s) and, for example, up to 25 parts, up to 20 parts, up to 15 parts or up to 10 parts per 100 parts by weight of polylactide resin(s).

Second non-cellular layer 32 contains at least 50%, preferably at least 80%, and more preferably at least 90% by weight of one or more polylactide resins. For the purposes of this invention, the terms "polylactide", "polylactic acid", and "PLA" are used interchangeably to denote polymers having at least 50% by weight of polymerized lactic units (i.e., those having the structure —OC(O)CH(CH$_3$)—), irrespective of how those lactic units are formed into the polymer. The polylactide resin preferably contains at least 80%, at least 90%, at least 95%, or at least 98% by weight of lactic units.

The polylactide may further contain repeating units derived from other monomers that are copolymerizable with lactide or lactic acid, such as alkylene oxides (including ethylene oxide, propylene oxide, butylene oxide, tetramethylene oxide, and the like), cyclic lactones, or carbonates. Repeating units derived from these other monomers can be present in block and/or random arrangements. These other repeating units suitably constitute up to about 10% by weight of the polylactide, preferably from about 0 to about 5% by weight, especially from about 0 to 2% by weight, of the polylactide, and may be absent.

The polylactide may also contain residues of an initiator compound, which is often used during the polymerization process to provide molecular weight control. Suitable such initiators include, for example, water, alcohols, polyhydroxyl compounds of various types (such as ethylene glycol, propylene glycol, polyethylene glycol, polypropylene glycol, other glycol ethers, glycerin, trimethylolpropane, pentaerythritol, hydroxyl-terminated butadiene polymers, and the like), polycarboxyl-containing compounds, and compounds having at least one carboxyl and one hydroxyl group (such as lactic acid or a lactic acid oligomer). The initiator residue preferably constitutes no more than 10%, especially no more than 5%, and especially no more than 2% of the weight of the polylactide, except in the case of a lactic acid or lactic acid oligomer, which can constitute any proportion of the polylactide.

The polylactide may have long-chain branches. Long-chain branches can be introduced in the polylactide in various ways, such as by reacting carboxyl groups on the polylactide with epoxide groups that are present on an acrylate polymer or copolymer. A preferred acrylate polymer or copolymer is characterized in being a solid at 23° C., containing an average of about 2 to about 15 free epoxide groups/molecule (such as about 3 to about 10 or about 4 to about 8 free epoxide groups/molecule), and being a polymerization product of at least one epoxy-functional acrylate or methacrylate monomer, preferably copolymerized with at least one additional monomer. The acrylate polymer or copolymer suitably has a number average molecular weight per epoxide group of about 150 to about 700 g/mol, such as 200 to 500 g/mol or 200 to 400 g/mol. The acrylate polymer or copolymer suitably has a number average molecular weight of 1000 to 6000 g/mol, such as about 1500 to 5000 g/mol or about 1800 to 3000 g/mol. Other useful approaches to introducing long-chain branching are described in U.S. Pat. Nos. 5,359,026 and 7,015,302 and in WO 06/002372A2.

The number average molecular weight of the polylactide may be, for example, in the range from 10,000 to 200,000 g/mol, as measured by gel permeation chromatography against a polystyrene standard. Number average molecular weights of about 30,000 to 130,000 g/mol are more preferred.

The polylactide resin is in some embodiments characterized by having a relative viscosity of 2 to 6, preferably 2.5 to 5, more preferably 3.5 to 4.5, measured using a 1% wt/vol solution of the polylactide resin in chloroform against a chloroform standard on a capillary viscometer at 30° C.

A preferred polylactide is a random copolymer of L-lactic acid and D-lactic acid, a block copolymer of L-lactic acid and D-lactic acid, or a mixture of two or more of these, in each case optionally containing residues of an initiator compound and/or branching agent. The preferred polylactide contains at least 95%, especially at least 98% by weight lactic units.

The lactic units in the polylactide may be either L- or D-units, or mixtures thereof. L- and D-lactic units may be distributed randomly or pseudo-randomly in the polylactide resin molecules.

The ratio of the lactic units and the manner in which they are copolymerized (i.e., randomly, block, multiblock, graft, and like) influence the crystalline behavior of the polylactide.

In some embodiments, the polylactide contains 50% to 92% of one lactic unit (either L- or D-) and 8% to 50% of the other lactic unit, or 75% to 92% of one lactic unit and 8% to 25% of the other lactic unit, in all cases based on the total weight of lactic units.

In other embodiments, the polylactide contains 92% to 100%, preferably 92% to 99.5%, especially 95% to 99.5%, of one lactic unit (either L- or D-) and from 0.5% to 8%, preferably from 0.5% to 8%, and especially from 0.5% to 5% of the other lactic unit, based on the total weight of lactic units.

Blends of two or more polylactides can be used, for example, to obtain desirable crystallization properties for the blend or to obtain a desired molecular weight distribution.

Therefore, in still other embodiments, the polylactide resin is a mixture of a polylactide resin (a) containing 95% to 100% L-lactic units and having a relative viscosity of 3.5 to 4.5 and 2% to 20%, based on the weight of the mixture, of a polylactide resin (b) containing 95% to 100% L-lactic units and a relative viscosity of 2 to 3.25. Another useful mixture is a mixture of a polylactide resin (a) containing 95% to 100% L-lactic units and having a relative viscosity of 3.5 to 4.5 and 2 to 25%, preferably 5% to 15%, based on the weight of the mixture, of a polylactide resin (c) containing 94% to 100% D-lactic units. Yet another useful mixture includes polylactide resin (a), 2% to 20%, based on the weight of the mixture, of a polylactide resin (b), and 2% to 25%, preferably 5% to 15%, based on the weight of the mixture, of a polylactide resin (c).

The polylactide resin(s) may include virgin materials and/or recycled post-industrial or post-consumer polylactide resin.

The polylactide resin (or mixture of resins) may be impact-modified, by which it is meant that the resin or mixture is combined with one or more additives that increase the impact strength of the resin or mixture relative to that of the polylactide resin or mixture by itself. The Dart impact strength of such an impact-modified polylactide resin is preferably at least 4, more preferably at least 8 Joules, as measured by ASTM D1709. The additive generally includes one or more polymeric materials having a glass transition temperature ($T_g$) of no higher than 20° C. as measured by differential scanning calorimetry (DSC). The glass transition temperature of the additive may be 0° C. or lower, −20° C. or lower, or −35° C. or lower.

Examples of impact modifiers include, for example, core-shell rubbers. Core-shell rubber rubbers are particulate materials having at least one rubber core encapsulated by at least one shell material. The rubber core has a $T_g$ of no more than 0° C., preferably no more than −10° C. The shell material has a $T_g$ of at least 50° C. by DSC. The shell material is preferably grafted onto the core, or is crosslinked. The rubber core suitably constitutes from 50 to 90%, especially from 50 to 85% of the weight of the core-shell rubber particle.

Methods for making core-shell rubbers are well known and are described, for example, in U.S. Pat. Nos. 3,655,825, 3,678,133, 3,668,274, 3,796,771, 3,793,402, 3,808,180, 3,843,735, 3,985,703, and 6,989,190. A suitable method is a two-stage polymerization technique in which the core and shell are produced in two sequential emulsion polymerization stages.

Commercially available core-shell rubbers that are suitable include those sold by the Dow Chemical Company under the Paraloid™ brand name, including Paraloid™ KM 355 and Paraloid™ BPM 500 core-shell rubbers, those sold by Kaneka under the KaneAce™ brand name, such as KaneAce ECO-100 core-shell rubber and Metablen™ products such as Metablen S2001, S2006, S2501, and W600A, sold by Mitsubishi Rayon Co., Ltd.

Other impact modifiers include rubbery polyolefins, various acrylic rubbers, ethylene-acrylic acid copolymers (as well as alkali metal salts thereof), ethylene-glycidyl meth-acrylate copolymers, various silicone rubbers, polymers and copolymers of conjugated dienes, polyurethane rubbers, and the like.

A suitable amount of impact modifier is 0.25 to 10 parts by weight per 100 parts by weight of polylactide resin(s).

The polylactide resin(s) may also include one or more crystallization promoters. These include, for example, one or more additives that function as crystal nucleators and/or as crystallization accelerators. Among the suitable crystallization promoters are finely divided solid materials that are thermally stable (i.e., do not melt or degrade) under the conditions of processing the polylactide resin to make the foam insulation structure. Examples of such finely divided solid materials include mineral powders such as talc, various clays and the like, as well as particulate high-melting thermoplastic polymers or thermoset polymers. Other crystallization promoters include acid amide compounds such as are described in EP 1887044, including ethylene bis (lauric acid amide), ethylene bis (isooleic acid amide), and ethylene bis (stearic acid amide). Crystallization accelerators include various plasticizers for the polylactide resin(s), including, for example, various citrate esters, glycerol fatty acid esters, various adipate esters, and the like.

Crystallization promoters are conveniently used in amounts of 0.01 to 10 parts by weight per 100 parts by weight of polylactide resin(s).

Second non-cellular layer 32 may contain up to about 45%, preferably up to 30%, by weight of one or more other thermoplastic polymers. Such other thermoplastic polymer(s) preferably are miscible with the polylactide resin(s) contained in second non-cellular layer 32.

First non-cellular layer 31 and second non-cellular layer 32 each may also contain other ingredients such as colorants, preservatives, anti-oxidants, and other stabilizers and biocides. These may constitute up to 10 parts by weight per 100 parts by weight of the respective layer.

Polylactide crystallites are crystals having crystalline melting temperatures of about 140° to 240° C., formed by the ordering of polylactide chains in the polylactide sheet. The range of crystalline melting temperatures reflects the number of different crystalline structures that form in polylactide resins, and the fact that the crystallites often have varying amounts of crystal defects that affect their melting temperatures. Polylactide crystallites having melting temperatures of 140° to about 195° C. are generally "polylactide homocrystals", which are formed when a single polylactide resin of high enantio-purity crystallizes by itself. Polylactide crystallites having melting temperatures from about 200° to 240° C. are typically "stereocomplex" crystallites that form when a polylactide resin containing mostly L-lactic units crystallizes with another polylactide resin containing mostly D-lactic units or from block copolymers with sufficiently enantio-pure blocks of lactic units to allow crystals to form. Second non-cellular layer 32 may contain polylactide crystals of either type or both types. Also included within the polylactide crystals are polylactide/blowing agent cocrystals as described below.

Crystallinity in the second non-cellular layer is conveniently measured using differential scanning calorimetry (DSC) methods. The amount of such crystallinity is expressed herein in terms of J/g, i.e., the enthalpy of melting, in Joules, of the polylactide crystals in the sample divided by the weight in grams of polylactide(s) in the sample. A convenient test protocol for making DSC measurements is to heat a 5-10 milligram sample from 25° to 225° C. at 20° C./minute under air on a Mettler Toledo DSC 821e calorimeter running Star V. 6.0 software or equivalent apparatus.

In some embodiments, second non-cellular layer 32 contains 10 J or less of polylactide crystallites per gram of polylactide resin present in the layer (J/g). In other embodiments, second non-cellular layer 32 contains at least 10 J/g, at least 25 J/g, or at least 35 J/g of polylactide crystallites.

The amount of crystallization present in second non-cellular layer 32 will depend on factors that include the particular polylactide resin(s) present, the presence of nucleating agents and/or plasticizers, and the thermal and processing history of the layer. Heating the layer during or following its manufacture to a temperature between the glass transition temperature of the polylactide resin(s) and its crystalline melting temperature promotes the formation of crystallites. Orienting the polymer during processing can also promote crystal formation.

An advantage of this invention is that second non-cellular layer 32 does not need to contain significant amounts of polylactide crystallites for multi-layer sheet 3 to withstand the exothermic temperature increases commonly seen when foam insulation structure 1 is made in a "pour-in-place" process or during use and/or testing conditions. This permits one to avoid performing a separate crystallization step, in which second non-cellular layer 32 (by itself or as part of multi-layer sheet 3) is subjected to crystallization conditions. Furthermore, uniform crystallization across second non-cellular layer 32 is often difficult to achieve in practice, especially with larger parts and parts that have complex geometries. The ability to obtain adequate thermal resistance in a structure that includes a polylactide layer containing less than 25 J/g, preferably less than 10 J/g of polylactide crystallites is an important benefit of the invention.

Multi-layer sheet 3 may contain layers in addition to the first non-cellular layer 31 and second non-cellular layer 32. However, if any additional layers are interposed between first non-cellular layer 31 and polymer foam layer 2 and/or between first non-cellular layer 31 and second non-cellular layer 32, those additional layers also should be non-cellular so first non-cellular layer 31 remains sealingly affixed to both polymer foam layer 2 and second non-cellular layer 32 (i.e., there is no opening for bulk transport of gas between major surface 5 of polymer foam layer 2 and second non-cellular layer 32).

In addition, first non-cellular layer 31 and second non-cellular layer 32 each may be made up of two or more plies, each ply meeting the foregoing description for the respective layer.

An additional layer of particular interest is a layer of a blend of the thermoplastic resin of first non-cellular layer 31 and the polylactide resin(s) of second non-cellular layer 32. Such a layer is a convenient way of recycling scrap that is produced during the manufacture of multi-layer sheet 3 and/or during further processing of multi-layer sheet (for example, by thermoforming). Such scrap may be, for example, trimmed material, rejects, or other waste from sheet coextrusion, subsequent thermoforming, and/or other processing of multi-layer sheet 3. Because it is not easy to separate the layers of multi-layer sheet once it is formed, using such scrap material to form one or more additional layers in multi-layer sheet 3 is a way to minimize waste of these scrap materials.

Alternatively or in addition, multi-layer sheet may contain one or more layers of one or more other materials, such as are described before with respect to opposing layer 4. Because of the unexpectedly good barrier properties of non-cellular layer 32, it is not necessary that any such additional layers have good barrier properties.

In specific embodiments, multi-layer sheet 3 may be, for example:

1. A bilayer sheet having, for example, an A-B construction, where A represents the first non-cellular layer and B represents the second non-cellular layer;

2. A tri-layer sheet having an A-B-A, A-A-B, A-B-C or A-C-B construction, wherein C represents a layer of a different material (including, for example, a layer of a blend of the thermoplastic resin of first non-cellular layer 31 and the polylactide resin(s) of second non-cellular layer 32;

3. A 4-ply sheet having, for example, an A-A-B-B, A-B-A-B, A-B-A-C, A-B-C-B, A-B-C-A, A-C-B-A or A-C-B-C construction;

4. A 5-ply sheet having an A-B-X-X-X construction, where each X independently represents A, B or C.

Multi-layer sheet 3 may have a thickness of, for example, 0.1 to 10 mm or more. Multi-layer sheet 3 preferably has a thickness of 0.4 to 10 mm, more preferably 1 to 5 mm. Second non-cellular layer 32 of multi-layer sheet 3 may have, for example, a thickness of 0.05 to 9 mm, preferably 0.15 mm to 5 mm and more preferably 0.7 to 4.5 mm. First non-cellular layer 31 of multi-layer sheet 3 may have a thickness, for example of 0.05 mm to 9.875 mm, 0.1 mm to 5 mm or 0.1 mm to 2.5 mm.

Multi-layer sheet 3 in some embodiments is made in a co-extrusion process, wherein the various constituent layers are extruded through appropriate die configuration such as a feedblock plus single manifold die or a multimanifold die and the extruded layers are married before cooling to form the multi-layer sheet. In such a process, a tie or other adhesive layer may be interposed between first non-cellular layer 31 and second non-cellular layer 32 if desired or necessary; however, in a preferred process, first and second non-cellular layers 31 and 32 are contacted directly with each other and adhere together without the presence of an intermediate adhesive layer. If desired, the coextruded multi-layer sheet may be calendered, passed between nip rollers, or otherwise processed to adjust its thickness further.

Alternatively, multi-layer sheet 3 can be prepared by forming some or all of the constituent layers separately and then adhering them together by, for example, heat softening one or more of the layers and then contacting the layers together, or through use of an adhesive layer.

The embodiment shown in the Figure includes optional opposing layer 4 which is affixed to the opposing major surface of polymer foam layer 2. It is generally preferred that opposing layer 4, when present, presents a barrier to the diffusion of atmospheric gases into and the escape of blowing agents from polymer foam layer 2. Opposing layer 4 preferably is non-cellular (as defined above) and sealingly affixed to polymer foam layer 2, for example by virtue of being adhered thereto, either directly or, less preferably, through an optional intermediate adhesive layer (not shown in the Figure). Opposing layer 4 preferably is in direct contact with a major surface of polymer foam layer 2 or in direct contact with an adhesive layer that itself is in direct contact with polymer foam layer 2.

In some embodiments, opposing layer 4 is a non-cellular polylactide sheet as described above with regard to second non-cellular layer 32. Alternatively, opposing layer 4 may be a multi-layer sheet such as multi-layer sheet 3 or other multi-layer sheet; a metal layer; a layer of a different polymer which is not a polylactide resin, which different polymer may be, for example, a thermoplastic or thermoset resin; a composite material; a cellulosic material such as wood, paper, or cardboard; a ceramic material such as glass;

and the like. In some embodiments, opposing layer 4 includes one or more recycled post-industrial and/or post-consumer polymers.

The peripheral edges, such as edges 6 of polymer foam layer 2 also preferably are covered with edge coverings (not shown) that present a barrier to the escape of blowing agents. In especially preferred embodiments, multi-layer sheet 3, opposing layer 4, and the edge coverings together form a sealed container that encloses all surfaces of polymer foam layer 2. The edge coverings, when present, may be integrated with opposing layer 4 and/or multi-layer sheet 3, if desired.

Multi-layer sheet 3 preferably exhibits a storage modulus of at least 10 MPa at 80° C. as measured by dynamic mechanical analysis (DMA). In specific embodiments, multi-layer sheet 3 can exhibit a storage modulus of at least 10 MPa at 100° C., a storage modulus of at least 10 MPa at 120° C., a storage modulus of at least 50 MPa at 80° C., a storage modulus of at least 50 MPa at 100° C., a storage modulus of at least 50 MPa at 120° C., a storage modulus of at least 100 MPa at 80° C., a storage modulus of at least 100 MPa at 100° C. or a storage modulus of at least 100 MPa at 120° C.

Multi-layer sheet 3 preferably exhibits a first deformation temperature of at least 60° C., preferably at least 80° C. and more preferably at least 90° C. First deformation temperature is measured by heating the sheet in an oven at 1° C./min from 25° C. to 125° C., taking images of the samples with a camera every 2 minutes. The images are examined visually to determine the temperature at which deformation or movement of the part is first observed (the first deformation temperature (FDT)).

Although multi-layer sheet 3 and opposing layer 4 are represented in the Figure as having a planar geometry, this is not necessary. Either or both of multi-layer sheet 3 and opposing layer 4 may have non-planar geometries and may be formed into complex shapes to incorporate various functional or other desirable features. Similarly, polymer foam layer 2 may have a non-planar geometry, and may not have a constant thickness.

Multi-layer sheets 3 having a non-planar geometry can be produced from planar multi-layer sheets via a thermoforming process. In the thermoforming process, the multi-layer sheet is softened by heating it to a temperature at which it softens, positioning the softened sheet over a positive or negative mold, and drawing and/or pressure forming the sheet on the mold to form a thermoformed part. In such a process, the multi-layer sheet may be heated, for example, until it attains a surface temperature of 100° to 200° C., 120° to 200° C., or 120° to 180° C., and then formed on the mold. Surface temperature is conveniently measured by detecting infrared radiation emitted from the surface of the multi-layer sheet using an infrared thermometer or an infrared thermal imaging camera.

Polylactide crystallites can be formed in second non-cellular layer 32 by maintaining the sheet within a temperature range between the glass transition temperature and the crystalline melting temperature of the polylactide crystallites. To produce a crystallinity of at least 25 J/g, suitable conditions include, for example, maintaining the multi-layer sheet at a temperature of 80° to 160° C., preferably 80° to 140° C., and more preferably 90° to 130° C. for a period of 30 seconds to five minutes, preferably 45 seconds to 5 minutes, and more preferably 60 seconds to 3 minutes.

Second non-cellular layer 32 can be crystallized during the thermoforming step. This is often desirable to avoid post-demold processing steps to crystallize the thermoformed part. Some crystallization may occur during the step of heating the multi-layer sheet in preparation for thermoforming. Some stress-induced crystallization may take place as the multi-layer sheet is stretched during the forming process. Further crystallization can take place on the mold, particularly if the temperature of the multi-layer sheet is maintained within the range of 60° to 160° C., preferably 80° to 140° C., and more preferably 90° to 130° C., and the residence time of the multi-layer sheet on the mold at such temperature is 30 seconds to 10 minutes, preferably 45 seconds to 5 minutes, and more preferably 60 seconds to 2 minutes.

Conversely, a second non-cellular layer 32 that contains little or no polylactide crystallinity is produced by avoiding exposing multi-layer sheet 3 to crystallization conditions. Some small amount of crystallinity will be produced during the extrusion and/or thermoforming steps described above, as the multi-layer sheet will necessarily pass through the range of temperatures at which crystallization takes place as it cools from the processing temperatures. In such cases, however, crystallization can be minimized by cooling multi-layer sheet 3 rapidly to quench the polylactide resin(s) before significant crystallization takes place.

The thermoforming process can be conducted using apparatus and general methods such as are described, for example, by Throne in "Thermoforming Crystallizing Poly (ethylene terephthalate) (CPET)", *Advances in Polymer Technology*, Vol. 8, 131-146 (1988). Drawing is preferably performed using vacuum. The mold may include a positive half that is inserted into the negative half during the process to provide positive mold forming. It may also be desirable to pre-stretch the sheet; if so, a pressure cap or other pre-stretching device may be used and actuated prior to drawing the sheet into the mold. Once the part is formed and cooled below its $T_g$, it is demolded and trimmed if necessary.

Foam insulation structure 1 can be made in various ways. In one method, the various layers are made separately and assembled together to form the structure by, for example, the use of adhesive layers, by heat-softening one or more of the layers and then laminating them together so they adhere to each other, or similar methods.

In another method, foam insulation structure 1 can be made in a coextrusion process, in which the various layers are simultaneously extruded and the extrudates representing the various layers are brought together while still heat-softened so they adhere together to form the structure.

In another method, foam insulation structure 1 is made in a foam-in-place method that comprises (1) applying a foam precursor mixture containing at least one polyisocyanate, water, and a physical blowing agent to the surface of first non-cellular layer 31 of multi-layer sheet 3 or both first non-cellular layer 31 of multi-layer sheet 3 and opposing layer 4, and (2) curing the foam precursor mixture while in contact with first non-cellular layer 31 of multi-layer sheet 3 or both first non-cellular layer 31 of multi-layer sheet 3 and opposing layer 4, to form polymer foam layer 2 adhered to first non-cellular layer 31 of multi-layer sheet 3 or both first non-cellular layer 31 of multi-layer sheet 3 and opposing layer 4. This is a preferred method for making appliance parts such as refrigerator and freezer cabinets and doors as well as smaller thermal insulating products such as coolers.

For example, appliances such as refrigerators and freezers can be manufactured in accordance with the invention by separately producing an inner liner that includes multi-layer sheet 3, and an outer shell which corresponds to opposing layer 4. The inner liner and outer shell are positioned together such that a cavity is formed between them, with first non-cellular layer 31 of multi-layer sheet 3 facing the cavity. The insulation foam layer 2 is then produced by introducing the foam precursor mixture into the cavity and allowing the precursor to react. As the precursor mixture reacts, it expands to fill the cavity due to the production of gas by the blowing agent(s) and then cures to form polymeric foam layer 2.

The curing of the foam precursor mixture is usually exothermic and therefore experiences a significant temperature rise due to the exothermic heat of reaction. This exposes multi-layer sheet 3 to elevated temperatures that may reach, for example, 60° to 160° C. or more. Surprisingly, multi-layer sheet 3 withstands distortion and other damage due to the exposure to such temperatures, even when second non-cellular layer 32 includes a polylactide resin having 25 J/g or less or even 10 J/g or less of polylactide crystallites.

The foam insulation structure of the invention is useful as cabinets and doors for appliances such as refrigerators and freezers; for making coolers and other insulated containers; for making insulated walls, roofs, ceilings of buildings, and other constructions; for insulating and as insulation structures for insulating ship hulls, refrigerated vehicles, and the like.

Although the invention is not limited to any theory, the excellent barrier properties of second non-cellular layer 32 may be attributable at least in part to the formation of cocrystals of the polylactide resin in such layer and physical blowing agent that diffuses from polymer foam layer 2 and through first non-cellular layer 31. As the physical blowing agent migrates into second non-cellular layer 32, the blowing agent is believed to form cocrystals with the polylactide resin. Thus the polylactide resin forms a crystalline complex ($\Sigma$-form cocrystals) with the physical blowing agent with the consequent encapsulation of the cocrystals by the host polylactide resin, (see P. Shaiju et al., *Macromolecules* 2016, 49, 224-233 and Hironori Marubayashi, et al., *J. Phys. Chem. B* 2013, 117, 385-397). The presence of these cocrystals is believed to contribute to the barrier properties of second non-cellular layer 32. Loss of the physical blowing agent through second non-cellular layer 32 is slowed because it is captured in or by the cocrystals. Capture of the physical blowing agent in second non-cellular layer 32 may cause second non-cellular layer 32 to become saturated with the physical blowing agent, so further migration of the physical blowing agent into second non-cellular layer 32 from polymer foam layer 2 is slowed or prevented.

The following examples illustrate the invention, but are not intended to limit it in any way. All parts and percentages are by weight unless otherwise indicated.

EXAMPLES 1 AND 2

0.4-mm bilayer sheets are prepared by coextruding a polylactide resin with a poly(methyl methacrylate) (PMMA) resin. The polylactide resin contains 95.5% of L-lactic units and 4.5% of D-lactic units, and has a relative viscosity of 3.5-4.5. For Examples 1A and 1B, the PMMA is Plexiglas® V825 resin, which has a Vicat softening temperature (ASTM D1525, 50° C./hr, 1 kg) of about 111° C. For Examples 2A and 2B, the PMMA is Plexiglas® Rnew B514, which has a Vicat softening temperature of about 78° C.

The coextrusions are performed at different layer ratios using a Randcastle unit equipped with an AB feedblock and single manifold die. Extrusion conditions are as indicated in Table 1. All resins are dried as recommended by the respective manufacturers. For Example 1, the die temperatures are 240° C. for the A feedblock (PMMA) and 220° C. for the B feedblock (polylactide resin). For Example 2, the die temperature is 220° C. for each block.

Layer thicknesses are determined for each of Examples 1A, 1B, 2A, and 2B by examination under a microscope. The layer thicknesses are as set forth in Table 1.

The storage moduli at 80° C. of each of Examples 1A and 2B are tested by DMA using a TA Instruments RSAIII instrument at a frequency of 1 Hz and a heating rate of 5° C./min.

Examples 1A, 2A, and 2B are thermoformed using a Frugal thermoformer at a sheet surface temperature between 120° C. and 180° C. The stretch ratio is ≈1.5×. Thermoformed parts were placed in an oven and heated at 1° C./min from 25° C. to 125° C. and images of the samples were taken by a camera every 2 minutes. The images were analyzed to determine the first deformation temperature (FDT), which is the temperature at which deformation or movement of the part is first observed.

Results of the foregoing testing are as indicated in Table 1.

TABLE 1

| Designation | PMMA type | Layer A (PMMA) thickness (% total sheet thickness) | Layer B (polylactide) thickness (% total sheet thickness) | Storage Modulus, 80° C. (MPa) | FDT (° C.) |
| --- | --- | --- | --- | --- | --- |
| Example 1A | Plexiglas V825 | 0.092 mm (23%) | 0.308 mm (77%) | >100 MPa | >90° C. |
| Example 1B | Plexiglas V825 | 0.116 mm (29%) | 0.284 mm (71%) | Not determined | Not determined |
| Example 2A | Plexiglas Rnew | 0.084 mm (21%) | 0.316 mm (79%) | Not determined | 60° C. |
| Example 2B | Plexiglas Rnew | 0.104 mm (26%) | 0.296 mm (74%) | 20 MPa | 60° C. |

These data show the advantage of using a resin with a higher Vicat softening point to prepare the first non-cellular layer. The storage modulus of Example 1A is much greater than that of Example 2B, even though in each case the PMMA layer constitutes only a small proportion of the total thickness of the sheet.

EXAMPLE 3

1-mm bilayer sheet Examples 3A, 3B, and 3C are prepared by coextruding a polylactide resin described in Example 1 with Plexiglas® MI-7T acrylate resin, which has a Vicat softening temperature of about 108° C. Coextrusion conditions are similar to Examples 1 and 2. Layer thicknesses are determined microscopically as in Example 1. The first deformation temperature of each of Examples 3A, 3B, and 3C are measured. Examples 3A, 3B, and 3C each are thermoformed in the same manner as Examples 1A, 2A, and 2B.

Results are as indicated in Table 2.

TABLE 2

| Designation | Layer A (PMMA) thickness (% total sheet thickness) | Layer B (polylactide) thickness (% total sheet thickness) | Storage Modulus, 80° C. (MPa) | FDT (° C.) |
|---|---|---|---|---|
| Example 3A | 0.37 mm (37%) | 0.63 mm (63%) | 220 MPa | 93° C. |
| Example 3B | 0.05 mm (5%) | 0.95 mm (95%) | 34 MPa | 56° C. |
| Example 3C | 0.07 mm (7%) | 0.93 mm (93%) | 11 MPa | 68° C. |

Examples 3A, 3B, and 3C show the effect of the thickness of the first non-cellular layer. Very thin layers provide the structure with thermal properties (storage modulus at 80° C. and FDT) that are similar to those of the polylactide resin layer by itself (<10 MPa and about 54° C., respectively).

EXAMPLES 4 AND 5

1.2-mm bilayer sheet Examples 4A, 4B, and 4C are made in the same general manner as Examples 1 and 2. The PMMA layer in each case is an impact-modified PMMA made by blending 98 parts by weight of Plexiglas® V920 acrylate resin (Vicat softening temperature about 100° C.) with 2 parts by weight of a core-shell rubber. The polylactide layer in each case is made by blending 95 parts of the polylactide resin described in Example 1 with 2.6 parts titanium dioxide powder and 2.4 parts core-shell rubber.

Bilayer sheet Examples 5A, 5B, and 5C are made in the same manner as Examples 4A, 4B, and 4C, respectively, except the Plexiglas® V825 resin replaces the Plexiglas® V920 resin.

In each case, the layer thickness is measured as in the previous examples. Examples 4A, 4C, and 5B are thermoformed as in previous examples, and the storage modulus at 80° C. is measured.

Results are as indicated in Table 3.

TABLE 3

| Designation | Layer A (PMMA) thickness (% total sheet thickness) | Layer B (polylactide) thickness (% total sheet thickness) | Storage Modulus, 80° C. (MPa) |
|---|---|---|---|
| Example 4A | 0.174 mm (14.5%) | 1.026 mm (85.5%) | >100 MPa |
| Example 4B | 0.194 mm (16.2%) | 1.006 mm (83.8%) | Not determined |
| Example 4C | 0.282 mm (23.5%) | 0.918 mm (76.5%) | >100 MPa |
| Example 5A | 0.206 mm (17.2%) | 0.994 mm (82.8%) | Not determined |
| Example 5B | 0.180 mm (15.0%) | 1.020 mm (85.0%) | >100 MPa |
| Example 5C | 0.222 mm (18.5%) | 0.978 mm (81.5%) | Not determined |

EXAMPLE 6

1.2-mm bilayer sheet Example 6 is made in the same general manner as Examples 1 and 2. The PMMA layer in each case is an impact-modified PMMA made by blending 98 parts by weight of Plexiglas® V825 acrylate resin with 2 parts by weight of a core-shell rubber. Its thickness is 0.25 mm. The polylactide layer in each case has a thickness of 0.85 mm and is made by blending 80 parts of the polylactide resin described in Example 1 with 15 parts Plexiglas® V825 acrylate resin, 2.6 parts titanium dioxide powder and 2.4 parts core-shell rubber. This example simulates a manufacturing setting in which some scrap material is recycled into the polylactide layer.

The bilayer sheet is coextruded and thermoformed using the same process conditions as in Example 4. The storage modulus of the sheet at 80° C. is higher than 100 MPa.

EXAMPLE 7

Foam insulation panels are made from each of bilayer sheet Examples 1-6. A 50-mm-thick layer of a closed-cell, rigid polyurethane foam is formed between the bilayer sheets in a pour-in-place process, to form a three-layer sandwich structure with the foam layer in the center and the PMMA layer facing the foam. The polyurethane foam is a product obtained by reacting a polyisocyanate, a polyol mixture and water in the presence of cyclopentane, and therefore contains a mixture of carbon dioxide and cyclopentane in its cells. All exposed edges of the foam layer are covered with a gas-impermeable metallic tape.

The thermal conductivity of the resulting assembly (Ex. 1) is measured according to DIN 52616 at a mean temperature of 10° C. The assembly is then aged for 629 days under atmospheric pressure air at a temperature of 25° C. and 50% relative humidity. The thermal conductivity is measured periodically during and at the end of the aging period.

For comparison, a similar assembly (Comp. Sample A) is prepared and evaluated in the same way, replacing the multilayer sheets with a layer of non-cellular high impact polystyrene (HIPS) of equivalent thickness.

The foam insulation panels of the invention retain thermal conductivity better than Comparative Sample A over the course of the aging test.

Specific Embodiments

1. A foam insulation structure comprising a) a polymer foam layer having opposing major surfaces and gas-filled cells that contain a physical blowing agent and b) a multi-layer sheet affixed to at least one of said opposing major surfaces of the polymer foam layer, wherein the multi-layer sheet includes i) a first non-cellular layer containing at least 50 weight-% of one or more thermoplastic resins, wherein the one or more thermoplastic resins is not a polylactide resin and has a Vicat softening temperature (ASTM D1525, 50° C./hr, 1 kg) of at least 70° C. and ii) a second non-cellular layer containing at least 50 weight-% of a polylactide resin, wherein the first non-cellular layer of the multi-layer sheet is sealingly affixed to the polymer foam layer and the second non-cellular layer of the multi-layer sheet is sealingly affixed to the first non-cellular layer of the multi-layer sheet.

2. The foam insulation structure of embodiment 1 wherein the one or more thermoplastic resins has a Vicat softening temperature (ASTM D1525, 50° C./hr, 1 kg) of at least 100° C.

3. The foam insulation structure of embodiment 1 or 2 wherein the one or more thermoplastic resins are miscible with the polylactide resin.

4. The foam insulation structure of any preceding embodiment wherein the one or more thermoplastic resins are a homopolymer of methyl methacrylate or a copolymer containing at least 70 weight-% polymerized methyl methacrylate.

5. The foam insulation structure of any preceding embodiment wherein the one or more thermoplastic resins are impact-modified.

6. The foam insulation structure of any preceding embodiment wherein the physical blowing agent is selected from one or more of a hydrocarbon having 3 to 8 carbon atoms; a fluorocarbon, hydrofluorocarbon, fluorochlorocarbon, or hydrofluorochlorocarbon having up to 8 carbon atoms; a hydrohaloolefin having up to 8 carbon atoms; and a dialkyl ether having up to 8 carbon atoms.

7. The foam insulation structure of any preceding embodiment wherein the physical blowing agent includes a hydrocarbon having 3 to 8 carbon atoms.

8. The foam insulation structure of embodiment 7 wherein the physical blowing agent includes cyclopentane.

9. The foam insulation structure of any preceding embodiment wherein the polymer foam is a reaction product of a foam precursor mixture containing at least one polyisocyanate, water and the physical blowing agent.

10. The foam insulation structure of any preceding embodiment wherein the multi-layer sheet has a thickness of 0.4 to 10 mm.

11. The foam insulation structure of any preceding embodiment wherein said first non-cellular layer has a thickness of 0.05 to 9.875 mm.

12. The foam insulation structure of any preceding embodiment wherein said second non-cellular layer has a thickness of 0.05 to 9 mm.

13. The foam insulation structure of any preceding embodiment wherein the thickness of said first non-cellular layer constitutes at least 10% of the total thickness of the multi-layer sheet.

14. The foam insulation structure of any preceding embodiment, wherein the multi-layer sheet further contains a layer of a blend of the polylactide resin and the second thermoplastic resin.

15. The foam insulation structure of embodiment 14, wherein the layer of a blend of the polylactide resin and the second thermoplastic resin includes recycled scrap material.

16. The foam insulation structure of any preceding embodiment, wherein the second non-cellular layer includes up to 45% by weight of the second thermoplastic resin, based on the total weight of the second non-cellular layer.

17. The foam insulation structure of any preceding embodiment, wherein the second non-cellular layer contains less than 25 J of polylactide crystallites per gram of polylactide resin in said second non-cellular layer.

18. The foam insulation structure of any preceding embodiment, wherein the polylactide resin is impact-modified.

19. The foam insulation structure of embodiment 18, wherein the polylactide resin contains a core-shell rubber.

20. The foam insulation structure of any preceding embodiment, wherein the multi-layer sheet has a non-planar geometry produced by thermoforming.

21. The foam insulation structure of any preceding embodiment, wherein a multi-layer sheet b) is sealingly affixed to both opposing major surfaces of the polymer foam layer.

22. The foam insulation structure of any of embodiments 1-20, wherein a metal layer is sealingly affixed to the opposing major surface of the polymer foam layer.

23. The foam insulation structure of any preceding embodiment, wherein the polymer foam layer has a thickness of 0.25 to 12 cm.

24. The foam insulation structure of embodiment any preceding embodiment, wherein the multi-layer sheet has a storage modulus of at least 50 MPa at 80° C.

25. The foam insulation structure of any preceding embodiment, wherein the multi-layer sheet has a first deformation temperature of at least 80° C.

26. The foam insulation structure of any preceding embodiment, which constitutes all or a portion of an appliance cabinet or door.

27. A method that comprises (1) applying a foam precursor mixture containing at least one polyisocyanate, water, and a physical blowing agent to the surface of a first non-cellular layer of a multi-layer sheet, which multi-layer sheet includes i) the first non-cellular layer, which contains at least 50 weight-% of one or more thermoplastic resins, wherein the one or more thermoplastic resins is not a polylactide resin and has a Vicat softening temperature (ASTM D1525, 50° C./hr, 1 kg) of at least 70° C., said first non-cellular layer being sealingly affixed to ii) a second non-cellular layer containing at least 50 weight-% of a polylactide resin and (2) curing the foam precursor mixture while in contact with the first non-cellular layer of the multi-layer sheet to form a polymer foam layer adhered to the first non-cellular layer of the multi-layer sheet.

28. The method of embodiment 27 wherein the one or more thermoplastic resins has a Vicat softening temperature (ASTM D1525, 50° C./hr, 1 kg) of at least 100° C.

29. The method of embodiment 27 or 28 wherein the one or more thermoplastic resins are miscible with the polylactide resin.

30. The method of any of embodiments 27-29 wherein the one or more thermoplastic resins are a homopolymer of methyl methacrylate or a copolymer containing at least 70 weight-% polymerized methyl methacrylate.

31. The method of any of embodiments 27-30 wherein the one or more thermoplastic resins are impact-modified.

32. The method of any of embodiments 27-31 wherein the physical blowing agent is selected from one or more of a hydrocarbon having 3 to 8 carbon atoms; a fluorocarbon, hydrofluorocarbon, fluorochlorocarbon, or hydrofluorochlorocarbon having up to 8 carbon atoms; a hydrohaloolefin having up to 8 carbon atoms; and a dialkyl ether having up to 8 carbon atoms.

33. The method of embodiment 32 wherein the physical blowing agent includes a hydrocarbon having 3 to 8 carbon atoms.

34. The method of embodiment 33 wherein the physical blowing agent includes cyclopentane.

35. The method of any of embodiments 27-34 wherein the polylactide resin is impact-modified.

36. The method of embodiment 35 wherein the polylactide resin includes a core-shell rubber.

37. The method of any of embodiments 27-36 wherein the multi-layer sheet has a thickness of 0.4 to 10 mm.

38. The method of any of embodiments 27-37 wherein said first non-cellular layer has a thickness of 0.05 to 9.875 mm.

39. The method of any of embodiments 27-38 wherein said second non-cellular layer has a thickness of 0.05 to 9.875 mm.

40. The method of any of embodiments 27-39 wherein said first non-cellular layer constitutes at least 10% of the total thickness of the multi-layer sheet.

41. The method of any of embodiments 27-40, wherein the multi-layer sheet further contains a layer of a blend of the polylactide resin and the second thermoplastic resin.

42. The method of any of embodiments 27-41, wherein the layer of a blend of the polylactide resin and the second thermoplastic resin includes recycled scrap material.

43. The method of any of embodiments 27-42, wherein the second non-cellular layer includes up to 45% by weight of the second thermoplastic resin, based on the total weight of the second non-cellular layer.

44. The method of any of embodiments 27-43, wherein the second non-cellular layer contains less than 25 J of polylactide crystallites per gram of polylactide resin in said second non-cellular layer.

45. The method of any of embodiments 27-44, wherein the polylactide resin is impact-modified.

46. The method of any of embodiments 27-45, wherein the multi-layer sheet has a non-planar geometry produced by thermoforming.

47. The method of any of embodiments 27-46, wherein the polymer foam layer has a thickness of 0.25 to 12 cm.

48. The method of any of embodiments 27-47, wherein the multi-layer sheet has a storage modulus of at least 50 MPa at 80° C.

49. The method of any of embodiments 27-48, wherein the multi-layer sheet has a first deformation temperature of at least 80° C.

50. The method of any of embodiments 27-49, wherein the foam precursor mixture is dispensed into a cavity formed by the sheet of the multi-layer sheet and a second layer and cured within the cavity to form a polymer foam layer adhered to the multilayer sheet and the second layer.

51. The method of any of embodiments 27-50, wherein the foam insulation structure is an appliance cabinet or door.

What is claimed is:

1. A method that comprises applying a foam precursor mixture containing at least one polyisocyanate, water, and a physical hydrocarbon blowing agent having 3 to 8 carbon atoms to a surface of a first non-cellular layer of a multi-layer sheet, which multi-layer sheet includes i) the first non-cellular layer, which contains at least 50 weight % of one or more thermoplastic resins, wherein the one or more thermoplastic resins is not a polylactide resin and has a Vicat softening temperature (ASTM D1525, 50° C./hr, 1 kg) of at least 70° C., said first non-cellular layer being sealingly affixed to ii) a second non-cellular layer containing at least 50 weight % of a polylactide resin and (2) curing the foam precursor mixture while in contact with the first non-cellular layer of the multi-layer sheet to form a polymer foam layer adhered to the first non-cellular layer of the multi-layer sheet.

2. The method of claim 1, wherein the one or more thermoplastic resins has a Vicat softening temperature (ASTM D1525, 50° C./hr, 1 kg) of at least 100° C.

3. The method of claim 2, wherein the one or more thermoplastic resins are a homopolymer of methyl methacrylate or a copolymer containing at least 70 weight % polymerized methyl methacrylate.

4. The method of claim 2, wherein said first non-cellular layer constitutes at least 10% of the total thickness of the multi-layer sheet.

5. The method of claim 2, wherein the second non-cellular layer contains less than 25 J of polylactide crystallites per gram of polylactide resin in said second non-cellular layer.

6. The method of claim 2, wherein the foam precursor mixture is dispensed into a cavity formed by the multi-layer sheet and a second layer and cured within the cavity to form a polymer foam layer adhered to the multilayer sheet and the second layer.

* * * * *